Jan. 24, 1956    W. A. GOSS    2,732,023
TRACTOR WITH POWER TAKE-OFF DRIVEN IMPLEMENT
SUPPORTED FROM THE AXLE THEREOF
Original Filed March 7, 1951    3 Sheets-Sheet 2
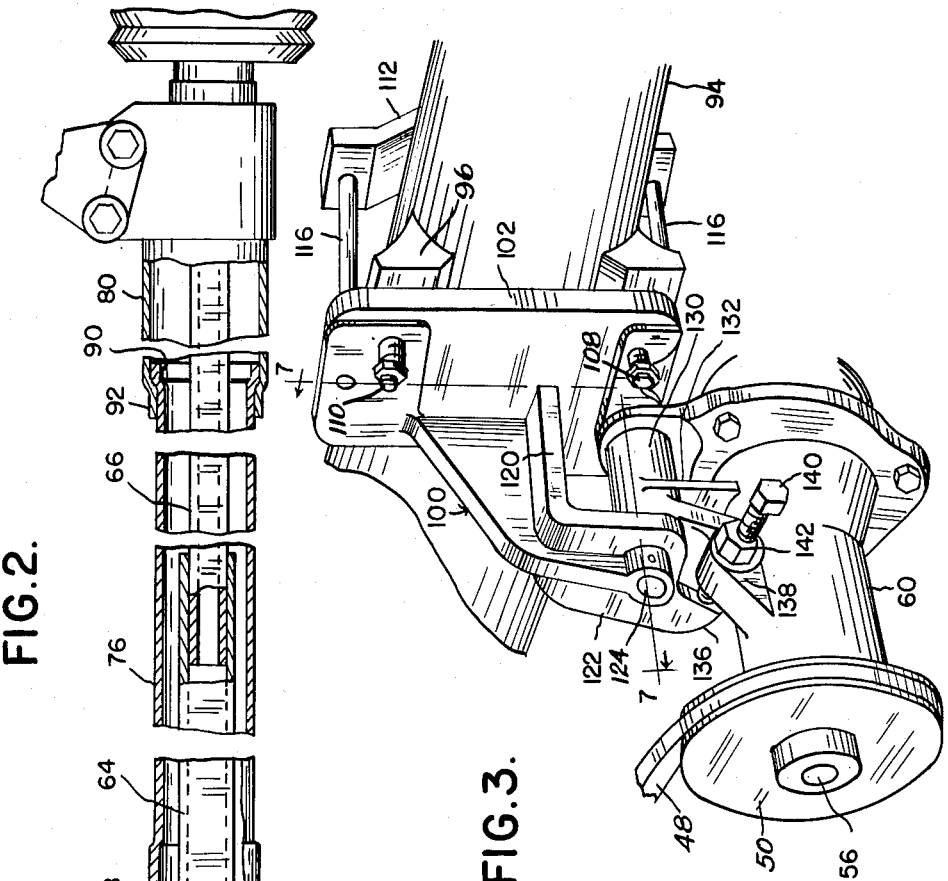
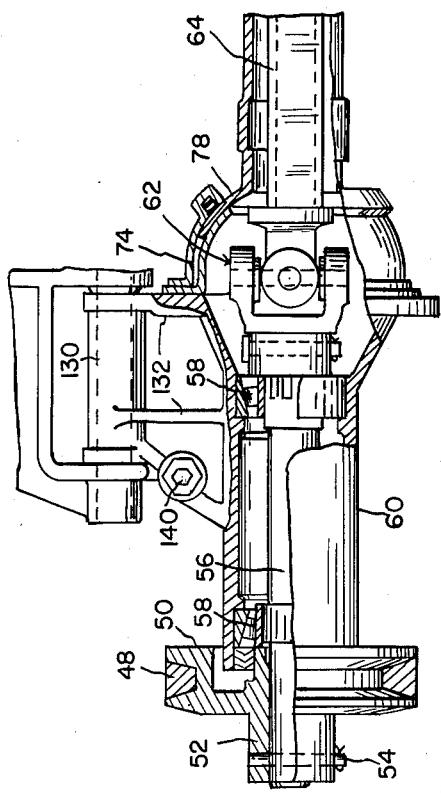
INVENTOR.
WILLIAM A. GOSS
BY *Whittemore*
*Hulbert & Belknap*
ATTORNEYS

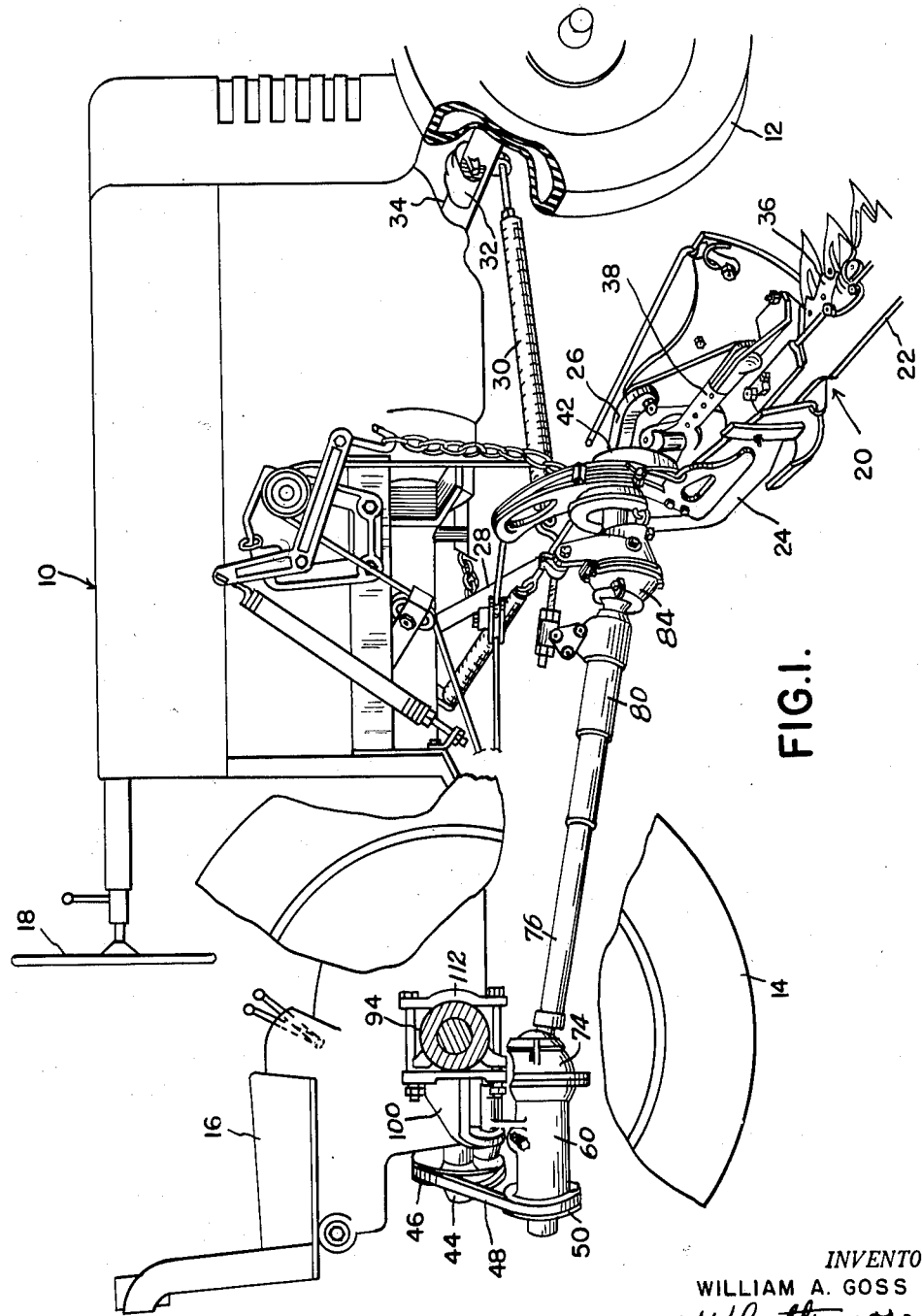
FIG. I.
INVENTOR.
WILLIAM A. GOSS

*INVENTOR.*
WILLIAM A. GOSS
BY Whittemore,
Hulbert & Belknap
ATTORNEYS

United States Patent Office 2,732,023
Patented Jan. 24, 1956

2,732,023

TRACTOR WITH POWER TAKE-OFF DRIVEN IMPLEMENT SUPPORTED FROM THE AXLE THEREOF

William A. Goss, Zanesville, Ohio, assignor to Detroit Harvester Company, Detroit, Mich., a corporation of Michigan Original application March 7, 1951, Serial No. 214,337, now Patent No. 2,709,881, dated June 7, 1955. Divided and this application May 27, 1952, Serial No. 290,239

3 Claims. (Cl. 180—53)

The present invention relates to tractor power take-off mechanism.

The present invention is a division of my prior co-pending application, Serial No. 214,337, filed March 7, 1951, and since issued as Patent No. 2,709,881.

It is an object of the present invention to provide in combination a tractor having a power take-off device, a rear axle, an implement drive shaft, and means for mounting the implement drive shaft on the rear axle for adjustment relative to the power take-off device.

It is a further object of the present invention to provide a novel mounting structure for an implement drive shaft to adjustably mount the drive shaft on the rear axle of a tractor.

It is a further object of the present invention to provide a novel mounting structure for an implement drive shaft including a bracket having three abutment members engageable with the drive shaft, at least two of said abutment members being adjustable.

Other objects and features of the invention will become apparent as the description proceeds, especially when taken in conjunction with the accompanying drawings, wherein:

Figure 1 is a side elevation with parts broken away, of a tractor-mower combination as viewed from the right side.

Figure 2 is a side elevation of a propeller shaft and mounting therefor, with parts in section.

Figure 3 is a perspective view of means for mounting the implement drive shaft on the tractor.

Figure 4:
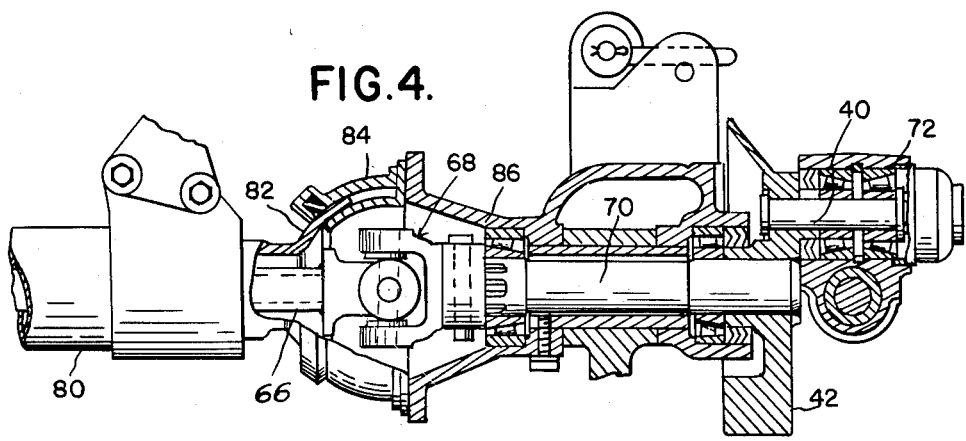
Figure 4 is a fragmentary side elevational view partly in section, showing the forward end of the propeller shaft.
Figure 6:
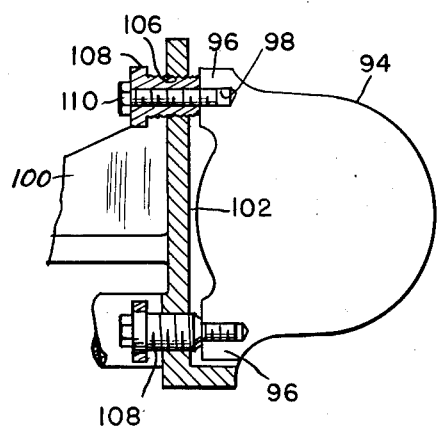
Figure 6 is an enlarged fragmentary section on the line 6—6, Figure 5.

The present invention is illustrated as incorporated in a combination tractor-mower but it will be appreciated that the invention is capable of other uses and in general, is applicable to the combination of a tractor and any implement which includes mechanism adapted to be driven from a power take-off shaft of a tractor.

The tractor is illustrated in general at 10 and comprises front wheels 12, rear wheels 14, a driver's seat 16, steering mechanism 18, and mower mechanism indicated generally at 20. The mower mechanism comprises a cutter bar 22 rigidly carried by an outer shoe 24 pivotally connected to an inner shoe, a portion of which is indicated at 26. The inner shoe is carried by a drag bar 28, the left hand end of the drag bar being pivoted to suitable supporting means at the left hand side of the tractor with provision for vertical swinging movement and for limited rearward swinging movement.

Suitable mechanism is provided for effecting power lifting of the drag bar and power tilting of the cutter bar, together with suitable counterbalance mechanism. This mechanism however, while illustrated, forms no part of the present invention and will not be described in detail.

The cutter bar 22 and drag bar 28 are urged to a forward cutting position by a tension spring 30, the forward end of which is connected to a bracket 32 carried by the front axle 34 of the tractor.

The cutter bar 22 includes a reciprocable sickle bar 36 connected by a pitman 38 to a crank pin 40 (Figure 4) carried by a fly wheel 42. Means are provided for effecting rapid reciprocation of the sickle bar 36 and this means comprises the power take-off shaft 44 carrying a drive pulley 46 connected by a flexible drive belt 48 to a pulley 50.

Referring now particularly to Figures 2 and 4, the pulley 50 includes a collar 52 pinned or otherwise connected as indicated at 54, to an implement drive shaft 56. The implement drive shaft 56 is journaled in suitable bearings 58 in an implement drive shaft housing 60 which will subsequently be described in further detail. At the forward end of the implement drive shaft 56 is a universal joint indicated generally at 62, which connects the implement drive shaft 56 to an enlarged propeller shaft section 64, this shaft section being herein illustrated as of square cross-section. Telescopically associated with the propeller shaft section 64 is a reduced propeller shaft section 66 also of square cross-section, the rearward end of the shaft section 66 extending into the forward end of the shaft section 64. At its forward end the shaft section 66 is coupled by a universal joint indicated generally at 68, with a shaft 70 which is keyed or otherwise secured to the fly wheel 42. The crank pin 40 extends outwardly from the fly wheel 42 and is connected by suitable coupling mechanism 72 to the pitman 38. The coupling mechanism 72 in this figure is turned through 90 degrees from its operative position to bring out its details.

Connected to the forward end of the implement drive shaft housing 60 is a spherically formed universal joint housing member 74. Means are provided for housing the propeller shaft and this means includes a rear shaft housing section 76 having its rear end spherically formed as indicated at 78 to cooperate with the spherically formed housing portion 74. The propeller shaft housing includes a forward section 80 terminating in a spherically shaped part 82 cooperating with a spherically formed universal joint housing portion 84 connected to the inner shoe 86. It will be recalled that the drag bar and cutter bar are urged forwardly by a tension spring 30. The position to which the spring 30 moves the drag bar and cutter bar is determined by stop means formed as a part of the shaft housing sections 76 and 80. As best seen in Figure 2 the forward end of the rear shaft housing section 76 is enlarged as indicated at 90, and the rear end of the forward section of the shaft housing is reduced as indicated at 92. The enlarged portion 90 and reduced portion 92 constitute abutments which limit forward movement of the drag bar and cutter bar. However, these parts may separate to permit rearward swinging movement of the cutter bar when it encounters an obstacle.

Inasmuch as the pulley 50 is connected by a flexible belt 48 to the driving pulley 46 of the power take-off device, it is essential that the axis of the implement drive shaft 56 shall be exactly parallel with the axis of the power take-off shaft 44. Special means are provided for mounting the implement drive shaft 56 in such a way that it may be adjusted into exact parallelism as required. Furthermore, this special mounting mechanism includes means for adjusting the implement drive shaft 56 toward and away from the power take-off shaft so as to adjust the tension in the belt 48. This mechanism is best illustrated in Figures 1, 3, 5, 6 and 7, to which reference is now made.

Figure 5:
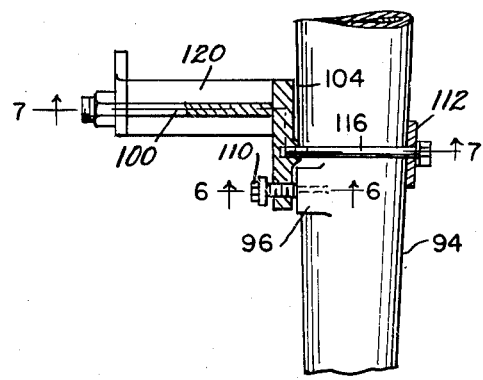
Figure 5 is a fragmentary plan view partly in section showing the attachment between the rear axle of the tractor and means for mounting the propeller drive shaft thereon.

As seen in Figure 5, the rear axle 94 of the tractor is tapered and is provided with a pair of raised pads 96, each of which is provided with a tapped opening 98. Associated with the rear axle and adjustably secured thereto is a bracket indicated generally at 100. The bracket includes a vertically extending plate portion 102 which, as best illustrated in Figure 5, is adapted to engage at one edge thereof with the tapered surface of the rear axle 94. This point of engagement is indicated by the reference numeral 104. The plate portion 102 is provided with a pair of enlarged threaded openings 106 in position to overlie the pads 96 and in each of the openings 106 there is provided a tubular externally threaded abutment member 108. Extending through the tubular abutment members 108 are fastening bolts 110 which are adapted to be threaded into the threaded holes 98 formed in the pads 96. There is thus provided a three-point abutment between the plate portion 102 of the bracket 100 and the axle 94. Inasmuch as two of the abutments are adjustable it will be understood that complete angular adjustment of the plate portion 102 relative to the axle 94 may be accomplished.

In order to retain the bracket 100 in adjusted position there is provided a plate 112 adapted to be positioned at the opposite side of the axle 94 from the bracket 100 and having its central portion concavely shaped as indicated at 114 to cooperate with the convex curvature of the axle. Tie bolts 116 are provided which extend from the plate 112 and engage in threaded sleeves 118 formed on the plate portion 102. When the tie bolts 116 are tightened the plate 112 and plate portion 102 of the bracket 100 grip the axle 94 tightly therebetween and maintain the bracket 100 rigidly in its accurately adjusted position.

The bracket 100 includes a rearwardly extending flange 120 having its rear end down-turned as indicated at 122, and apertured to receive a pivot pin 124. The pivot pin 124 extends through an opening 126 provided in the plate portion 102 of the bracket. The flange 120 is made rigid by means of a supporting web 128 connecting the plate portion 102 therewith.

Figure 7:
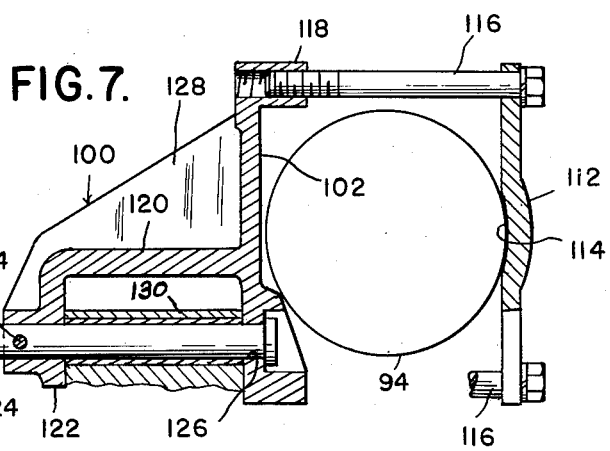
Figure 7 is an enlarged sectional view on the line 7—7, Figures 3 and 5.

The shaft housing 60, as best seen in Figure 3, includes a tubular portion 130 spaced above the main housing portion by webs indicated generally ta 132. The tubular portion 130, as best seen in Figure 7, is received between the down-turned end 122 of the flange 120 and the plate portion 102. The parts are coupled together by the pivot pin 124 which is illustrated as retained in place by a pin 134.

The down-turned portion 122 of the flange 120 includes a rigid downwardly extending abutment portion 136 and the implement drive shaft housing 60 includes an upwardly extending ear 138 which is apertured to receive an adjusting screw 140, the end of which is engageable with the fixed abutment 136. Associated with the adjusting screw 140 is a lock nut 142 by means of which the screw may be clamped in adjusted position.

With the foregoing construction it is apparent that the bracket 100 may be angularly adjusted in space by virtue of its three-point connection with respect to the rear axle 94 so that the axis of the implement drive shaft 56 may be adjusted in space into exact parallelism with the axis of the power take-off shaft. Moreover, by virtue of the pivot mounting of the implement drive shaft 56 about the axis of the pin 124, the implement drive shaft may be adjusted toward and away from the power take-off shaft in order to control the tension of the belt 48.

The drawings and the foregoing specification constitute a description of the improved tractor power take-off mechanism in such full, clear, concise and exact terms as to enable any person skilled in the art to practice the invention, the scope of which is indicated by the appended claims.

What I claim as my invention is:

1. In combination with a tractor having a power take-off device adjacent the rear thereof and having a tapered rear axle and a pair of raised pads on the rear axle spaced apart transversely thereof and having tapped holes therein, a bracket for supporting an implement drive shaft in position to be connected to the power take-off device of the tractor, said bracket comprising a plate portion having an edge portion engaged with the rear axle adjacent the pads thereon, externally threaded hollow abutments adjustably carried by said plate portion and engageable with said pads, threaded fastening elements extending through said abutments and engaging in the tapped holes in said pads, a plate adapted to be positioned at the opposite side of the axle from said plate portion, and means connecting said plate and plate portion to clamp them against the tractor axle.

2. In combination with a tractor having a power take-off device adjacent the rear thereof and having a tapered rear axle and a pair of raised pads on the rear axle spaced apart transversely thereof and having tapped holes therein, a bracket for supporting an implement drive shaft in position to be connected to the power take-off device of the tractor, said bracket comprising a plate portion having an edge portion engaged with the rear axle adjacent the pads thereon, adjustable threaded abutments on said plate portion engageable with the pads on the axle, a plate positioned at the opposite side of the axle from said plate portion, and means connecting said plate and plate portion to clamp them against the tractor axle.

3. In combination with a tractor having a power take-off device adjacent the rear thereof and having a tapered rear axle and a pair of raised pads on the rear axle spaced apart transversely thereof and having tapped holes therein, a bracket for supporting an implement drive shaft in position to be connected to the power take-off device of the tractor, said bracket comprising a plate portion having an edge portion engaged with the rear axle adjacent the pads thereon, adjustable threaded abutments on said plate portion engageable with the pads on the axle, a plate positioned at the opposite side of the axle from said plate portion, and means connecting said plate and plate portion to clamp them against the tractor axle, said bracket comprising spaced apertured portions, a shaft housing carried by said bracket and pivoted between said apertured portions, an abutment on one of said portions, and an adjusting bolt on said housing engaging said abutment to provide for angular adjustment of said housing relative to said bracket.

References Cited in the file of this patent

UNITED STATES PATENTS

| | | |
|---|---|---|
| 2,142,365 | McKee | Jan. 3, 1939 |
| 2,256,413 | Simpson | Sept. 16, 1941 |
| 2,289,598 | Sladecek | July 14, 1942 |
| 2,318,202 | Colvin et al. | May 4, 1943 |
| 2,328,617 | Colvin | Sept. 7, 1943 |
| 2,330,687 | Coultas et al. | Sept. 28, 1943 |
| 2,486,161 | Hughes | Oct. 25, 1949 |
| 2,542,907 | Dayton et al. | Feb. 20, 1951 |

FOREIGN PATENTS

| | | |
|---|---|---|
| 267,062 | Switzerland | June 16, 1950 |

OTHER REFERENCES

Publication in class 56–25 in Div. 5 entitled "Dearborn Side Mounted Mower, Model 14–3 and 14–4, Assembly and Operating Instructions," copyrighted 1948 by Dearborn Motors Corporation, Detroit, Michigan.